United States Patent

Corcoles et al.

[11] Patent Number: 5,331,500
[45] Date of Patent: Jul. 19, 1994

[54] CIRCUIT BREAKER COMPRISING A CARD INTERFACING WITH A TRIP DEVICE

[75] Inventors: Vincent Corcoles, St. Martin d'Heres; Christian Tedeschi, Jarrie; Alain Delvecchio, Echirolles; Didier Fraisse, St. Martin d'Heres, all of France

[73] Assignee: Merlin Gerin, France

[21] Appl. No.: 812,289

[22] Filed: Dec. 23, 1991

[30] Foreign Application Priority Data

Dec. 26, 1990 [FR] France .................................. 90 16403

[51] Int. Cl.⁵ ............................................ H02H 3/05
[52] U.S. Cl. ...................................... 361/93; 361/115
[58] Field of Search ................ 361/93, 115, 79, 83, 361/89

[56] References Cited

U.S. PATENT DOCUMENTS 4,007,401  2/1977  Kimmel et al. .................. 361/93
4,181,389  1/1980  Kiesel et al. .................... 361/115
4,649,455  3/1987  Scott ............................... 361/93

FOREIGN PATENT DOCUMENTS 2583569  12/1986  France ........................... H02H 3/08

Primary Examiner—A. D. Pellinen
Assistant Examiner—S. Jackson
Attorney, Agent, or Firm—Parkhurst, Wendel & Rossi

[57] ABSTRACT

The interface card fixedly secured to the circuit breaker supplies information representative of the circuit breaker type and rating to a standard removable trip device. It comprises for example resistances designed to be connected in parallel to a resistance of a divider bridge defining in the trip device the instantaneous tripping threshold, modifying this threshold automatically according to the circuit breaker type and rating. The interface card can also supply the trip device with information representative of the rated current flowing in the primary winding of the current transformers fixedly secured to the circuit breaker.

10 Claims, 5 Drawing Sheets

CIRCUIT BREAKER COMPRISING A CARD INTERFACING WITH A TRIP DEVICE

BACKGROUND OF THE INVENTION

The invention relates to a circuit breaker comprising means for measuring the current flowing in conductors to be protected and designed to cooperate with a standard removable electronic trip device comprising a processing circuit producing a tripping signal when the measured current exceeds preset tripping thresholds.

Circuit breakers can generally be used with different types of electronic trip devices, which are therefore generally removable and are only fitted in a circuit breaker when the latter is installed. Conventional electronic trip devices perform the long delay and/or short delay and/or instantaneous tripping functions, and possibly an earth protection function. For these different functions, the tripping threshold settings can generally be adjusted by the user. It is also preferable for the trip device to perform an instantaneous tripping function designed to protect the circuit breaker, whose threshold is adjusted to suit the circuit breaker type and rating so as to be adapted to the electrodynamic withstand of the circuit breaker. This instantaneous tripping function is conventionally achieved by means of an analog trip circuit of the trip device whose threshold is set in the manufacturing plant on the trip device, according to the circuit breaker for which it is intended. In present-day circuit breakers the current transformers, fixedly secured to the circuit-breaker, are designed in such a way as to supply a predetermined current, typically 100 mA, on the secondary winding when a rated current of preset value, for example 160A, 250A, 400A or 630A, flows through their primary winding. The trip device processing circuit processes the signals which are supplied to it by the current transformers without taking account of the rated current value, the tripping thresholds being defined in relative value with respect to this rated current, at least in the case of the long delay, short delay and instantaneous tripping functions. In some cases, however, the processing circuit has to know the rated current value, notably when the trip device comprises means for displaying the current flowing in the conductors to be protected, for communication with a remote monitoring device and, sometimes, for earth protection. Up to now this information has been supplied to the trip device in the plant, according to the circuit breaker for which it is intended. In the case of microprocessor-based trip devices, this is conventionally achieved by means of an individualization box which supplies, in the plant, the rated current value to a memory of the microprocessor.

The type and/or rating of the circuit breaker in which the trip device is to be fitted therefore has to be known in advance when a trip device is manufactured.

SUMMARY OF THE INVENTION

The object of the invention is to overcome this drawback.

This object is achieved by the fact that the circuit breaker according to the invention comprises an interface card, fixedly secured to the circuit breaker, designed to be connected to the trip device when the latter is connected in the circuit breaker, the interface card comprising means representative of the circuit breaker type and/or rating and comprising an output connector to which said means are connected and designed to be connected to a complementary connecting device of the trip device, the complementary connecting device being connected to the trip device processing circuit so as to supply the processing circuit with information representative of the circuit breaker type and/or rating.

The interface card, which takes account of the circuit breaker type and/or rating, is fitted in the circuit breaker when it is manufactured. The trip device is a standard trip device. Its connection with the circuit breaker, and in particular with the circuit breaker interface card, supplies the processing circuit with information representative of the circuit breaker type and/or rating.

According to a first development of the invention, the means representative of the circuit breaker type and/or rating comprise means for adjusting an instantaneous tripping threshold according to the circuit breaker type and rating.

The trip device preferably comprises a divider bridge formed by at least two resistances to set a minimum instantaneous tripping threshold, and the interface card comprises at least one resistance adapted to suit the circuit breaker type and rating, designed to be connected in parallel to one of the divider bridge resistances when the trip device is connected in the circuit breaker.

According to a preferred embodiment, the interface card is a standard card comprising resistances connected in parallel and whose connections to the interface card output connector are selectively interrupted according to the circuit breaker type and rating. It then suffices to have a standard interface card which is adapted to the circuit breaker when the latter is manufactured. This adaptation is achieved very simply by interrupting a certain number of connections connecting the resistances to the connector.

According to a second development of the invention, the means representative of the circuit breaker type and/or rating comprise means representative of the rated current supplied by the means for measuring the current, the trip device comprising means for applying to the processing circuit signals representative of the value of said rated current when the trip device is connected in the circuit breaker.

The means representative of the rated current can comprise a single resistance or a series of electrical connections supplying information coded in binary form.

According to another development of the invention, the interface card comprises a printed circuit card comprising conductors connecting a preset number of terminals of the interface card output connector to a preset number of interface card inputs, said inputs being connected to components of the circuit breaker. The interface card connector is used to connect the trip device easily with other circuit breaker components, notably the current transformers and a trip coil. These components are connected to interface card inputs when the circuit breaker is manufactured and a single connector, fitted on the interface card, enables all the necessary electrical connections to be made between the trip device and circuit breaker when the trip device is fitted in the circuit breaker, while supplying the trip device with the information it needs on the circuit breaker type and/or rating.

BRIEF DESCRIPTION OF THE DRAWINGS

Other advantages and features will become more clearly apparent from the following description of an illustrative embodiment of the invention, given as a non-restrictive example only and represented in the accompanying drawings, in which.

DESCRIPTION OF THE PREFERRED EMBODIMENT

Figure 1:
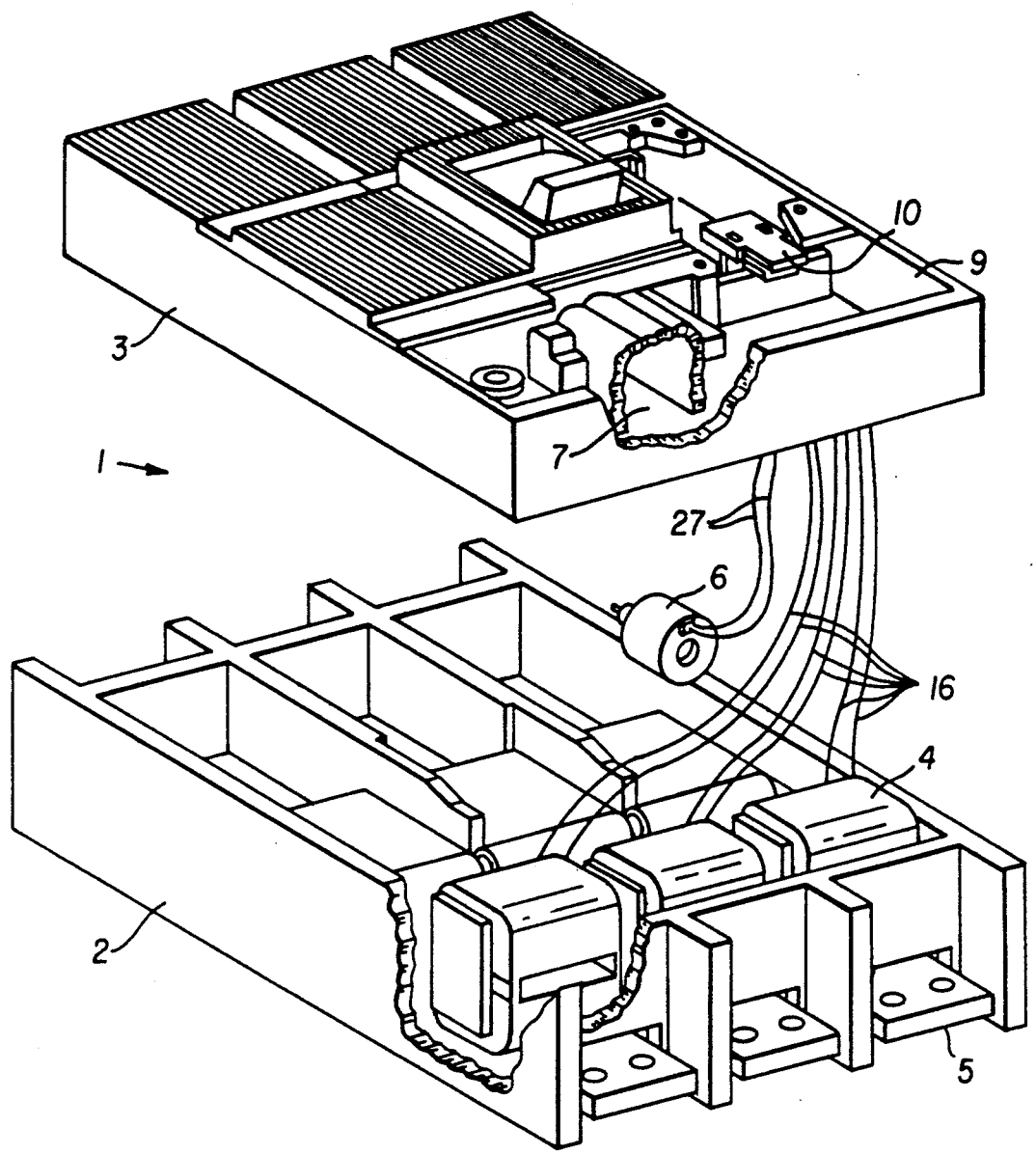
FIG. 1 represents, in exploded form, a circuit breaker without a trip device.

In FIG. 1, only the circuit breaker components necessary for a good understanding of the invention have been represented. The circuit breaker 1 comprises a base 2 and a cover 3. In the base 2 there are located current transformers 4. Some of the walls have been cut away to better show the arrangement of the current transformers in the base. The circuit breaker represented in FIG. 1 is a three-phase circuit breaker, comprising three current transformers 4, arranged side by side. Current input terminals 5, designed to be connected to the mains conductors to be protected, form the current transformer primary windings. A trip coil 6 is located in a housing 7 (one wall of which has been cut away in the figure) of the cover 3. A removable electronic trip device 8 (FIG. 3) is designed for fitting in a housing 9 opening onto the front face of the cover 3.

Figure 2:
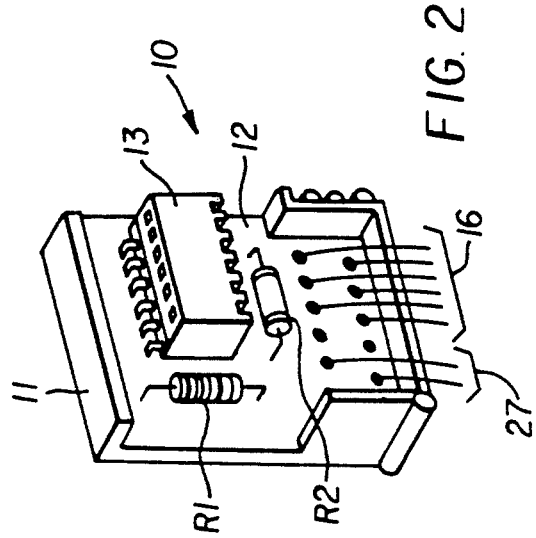
FIG. 2 is a perspective bottom view of a particular embodiment of the interface card of the circuit breaker according to FIG. 1.

An interface card 10 acts as interface between the circuit breaker 1 and trip device 8. This card, represented in greater detail in FIG. 2, is fixedly secured to the circuit breaker. It comprises a support 11 on which a printed circuit card 12 is mounted. On this card 12 there is mounted a connector 13 designed to cooperate with a complementary connector fixed to a printed circuit card 14 of the trip device 8. When the removable trip device 8 is fitted in the circuit breaker housing 9, the interface card and trip device connectors provide the electrical connection between the trip device and interface card 10.

Figure 3:
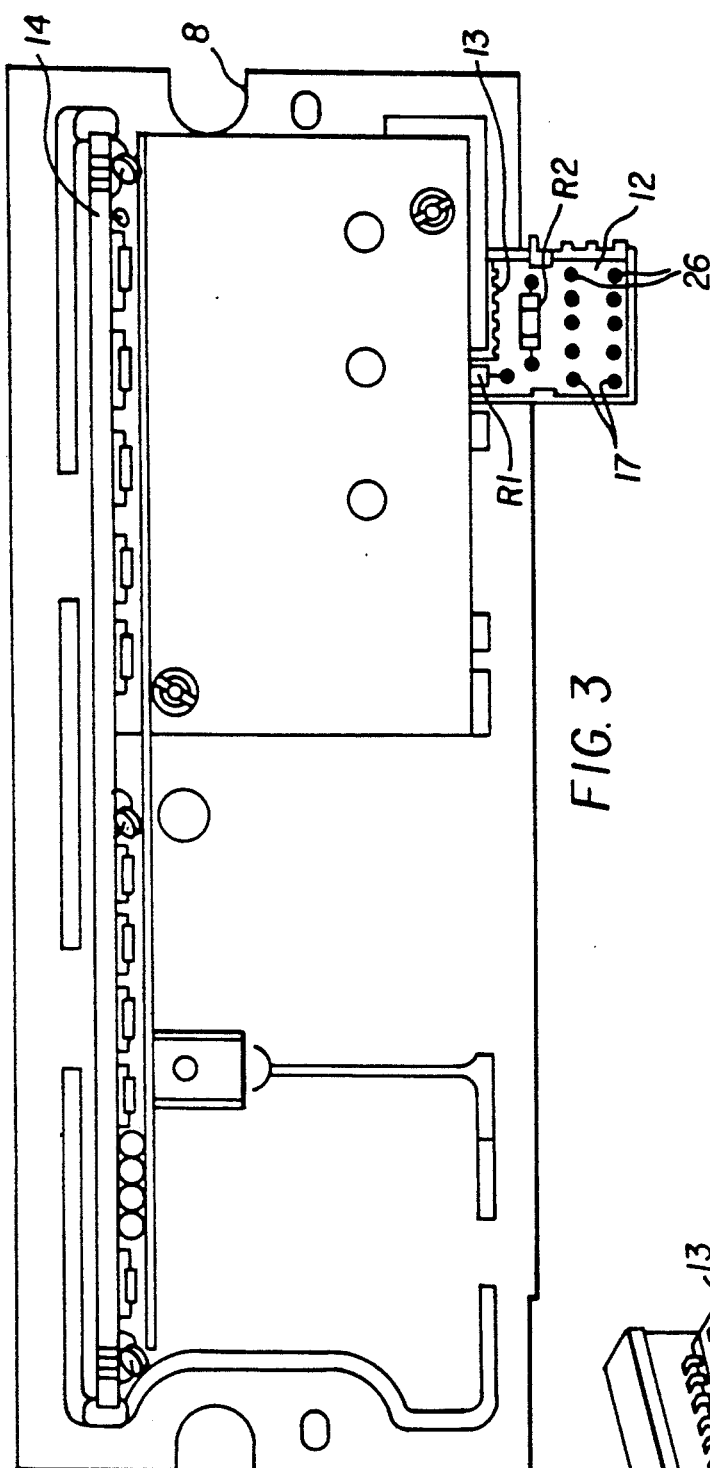
FIG. 3 is a bottom view of the connection between the interface card according to FIG. 2 and a trip device.
Figure 4:
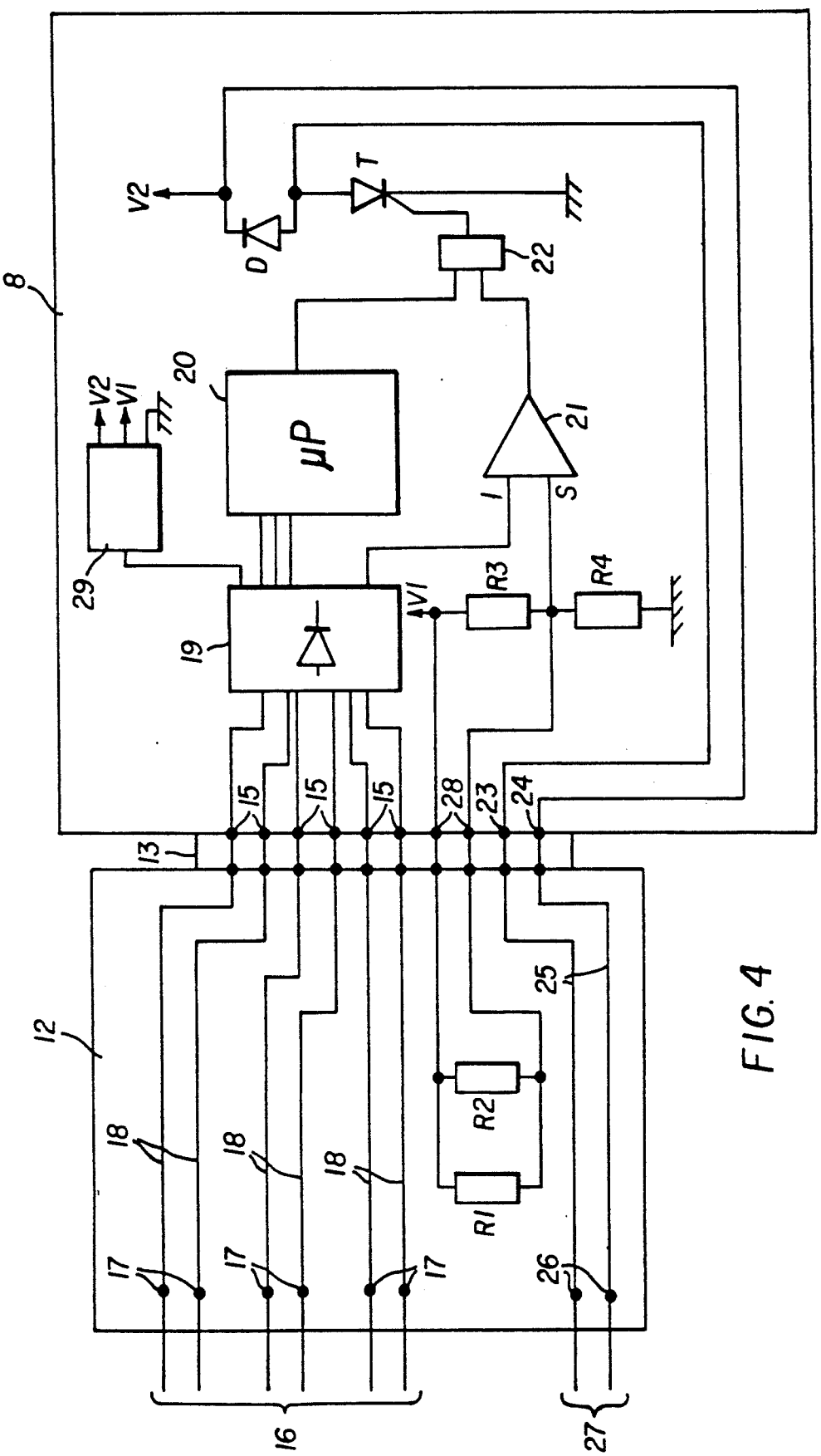
FIGS. 4 to 6 represent, in block diagram form, the components of the trip device and of three alternative versions of the interface card, and their connections.

The interface card 10 represented in FIGS. 2 to 4 comprises means for adjusting the instantaneous tripping threshold adapted to the circuit breaker type and rating. In the preferred embodiment represented, these means are formed by two parallel connected resistances R1 and R2.

FIG. 4 makes it easier to understand the role of the interface card. The trip device 8 receives, on inputs 15, the output signals from the current transformers 4. These signals are transmitted to it by means of the interface card 10. The secondary windings of the current transformers are in fact connected by conductors 16 to inputs 17 of the interface card. Conductors 18, formed on the printed circuit card 12 of the interface card, connect each of these inputs 17 to a corresponding terminal of the connector 13, itself connected to one of the inputs 15, when the trip device is fitted in the circuit breaker. These trip device inputs 15 are connected to a rectifier circuit 19 which supplies signals representative of the currents flowing in the conductors to be protected to a processing circuit, which can comprise a circuit 20, for example microprocessor-based, performing the long delay, short delay and/or ground fault tripping functions of the trip device. It also comprises an analog circuit 21 performing an instantaneous tripping function designed to protect the circuit breaker. This circuit 21 essentially comprises a comparison circuit between a threshold value S and a signal I, supplied by the rectifier circuit 19 and representative of the maximum current flowing in the conductors to be protected. The trip signals supplied by the analog circuit 21 when the maximum current exceeds the threshold S, or by the circuit 20, are applied by an interface 22 to the control electrode of an electronic commutator. This is formed by a thyristor T in the embodiment represented. The thyristor gate is connected to the output of the interface 22. Its source is grounded and its drain is connected to an input terminal 23 of the trip device connector. Another input terminal 24 of the trip device connector is connected to a supply voltage V2. A diode D, normally reverse biased, is connected between the terminals 23 and 24. The terminals 23 and 24 are connected to corresponding terminals of the connector 13 of the interface card 10, themselves connected by conductors 25 to inputs 26 of the interface card. These inputs 26 are connected by conductors 27 to the trip coil 6.

The threshold S is obtained by a voltage divider. In FIG. 4, this voltage divider is formed by two resistances R3 and R4 serially connected between a supply voltage V1 and ground. The resistances R1 and R2 of the interface card are connected in parallel to two terminals of the connector 13 associated with two input terminals 28 of the trip device, themselves connected to the terminals of resistance R3.

In FIG. 4, the resistances R1, R2 and R3 are connected in parallel and define a threshold S with the resistance R4. This threshold can easily be modified. For instance, if one of the resistances R1 or R2 is removed, the threshold decreases. With two resistances R1 and R2 on the interface card, it is easy to obtain four different threshold values, i.e. a maximum value when R1 and R2 are both present, a minimum value when R1 and R2 are absent, and two intermediate values, a first one when R1 is disconnected and a second one when R2 is disconnected. Disconnection is achieved, for example, by interrupting the connection between the resistance involved and one of the terminals associated with the interface connector 13. This can, for example, be achieved by cutting the lugs of the resistance involved.

The invention is naturally not limited to an interface card comprising two parallel resistances. It is in particular possible to provide a larger number of resistances, so as to increase the number of intermediate threshold values available. One of the resistances can be formed by a portion of conductor acting as shunt for the resistance R3, so as to define a higher maximum threshold. It is also possible to connect two or more resistances serially and not in parallel on the interface card and to short-circuit the resistances which are not required.

In the embodiment represented in FIG. 4, the voltages V1 and V2 are supplied by a power supply circuit 29 itself supplied by the rectifier circuit 19. The invention is naturally not limited to a system-powered trip device of this kind, but can be applied to any type of trip device in which a minimum instantaneous tripping threshold is defined in the trip device, and can be modified by connection of the interface card.

The same principle can be applied to the instantaneous tripping threshold on closing (DINF).

Figure 5:
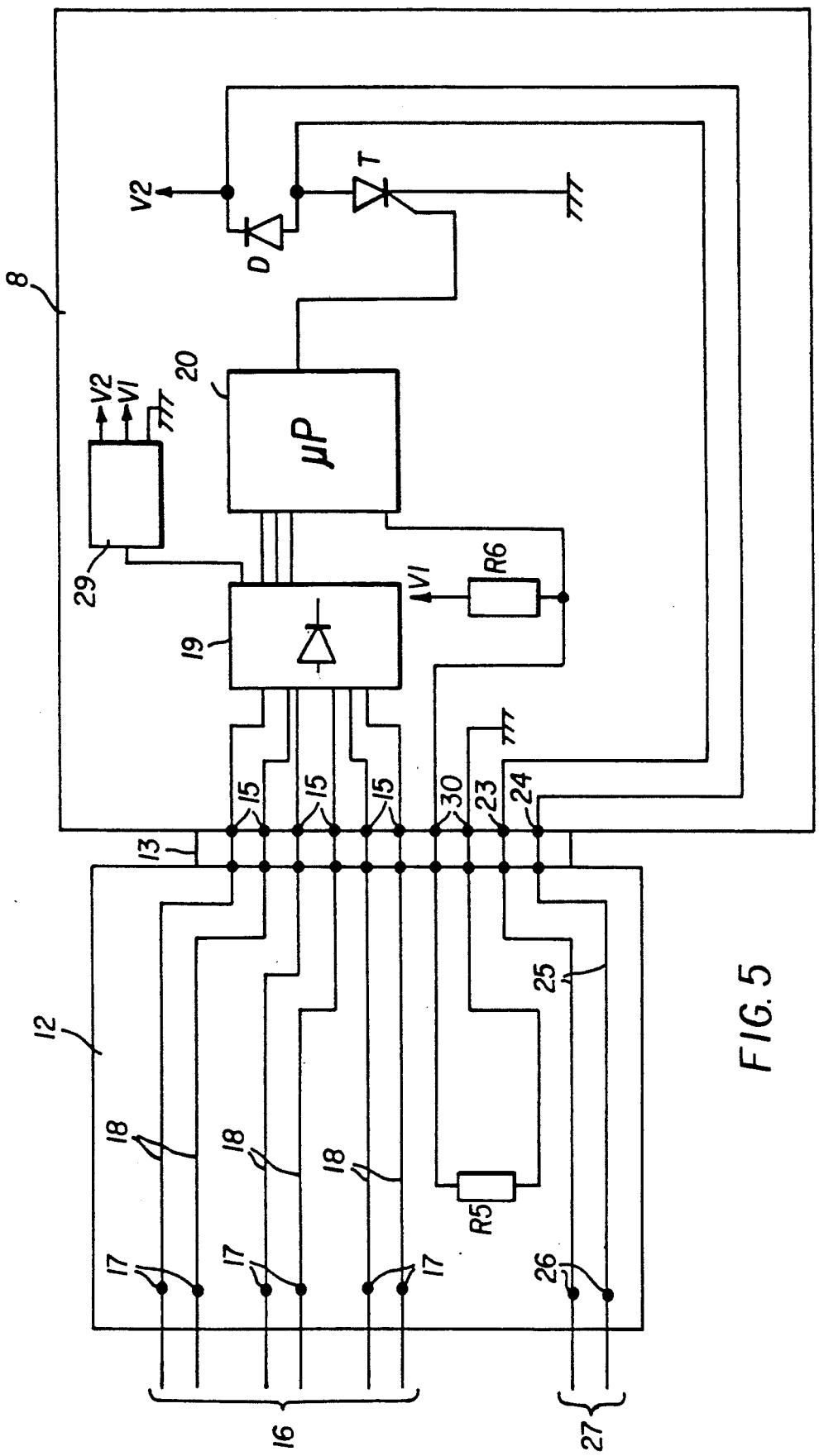
Figure 6:
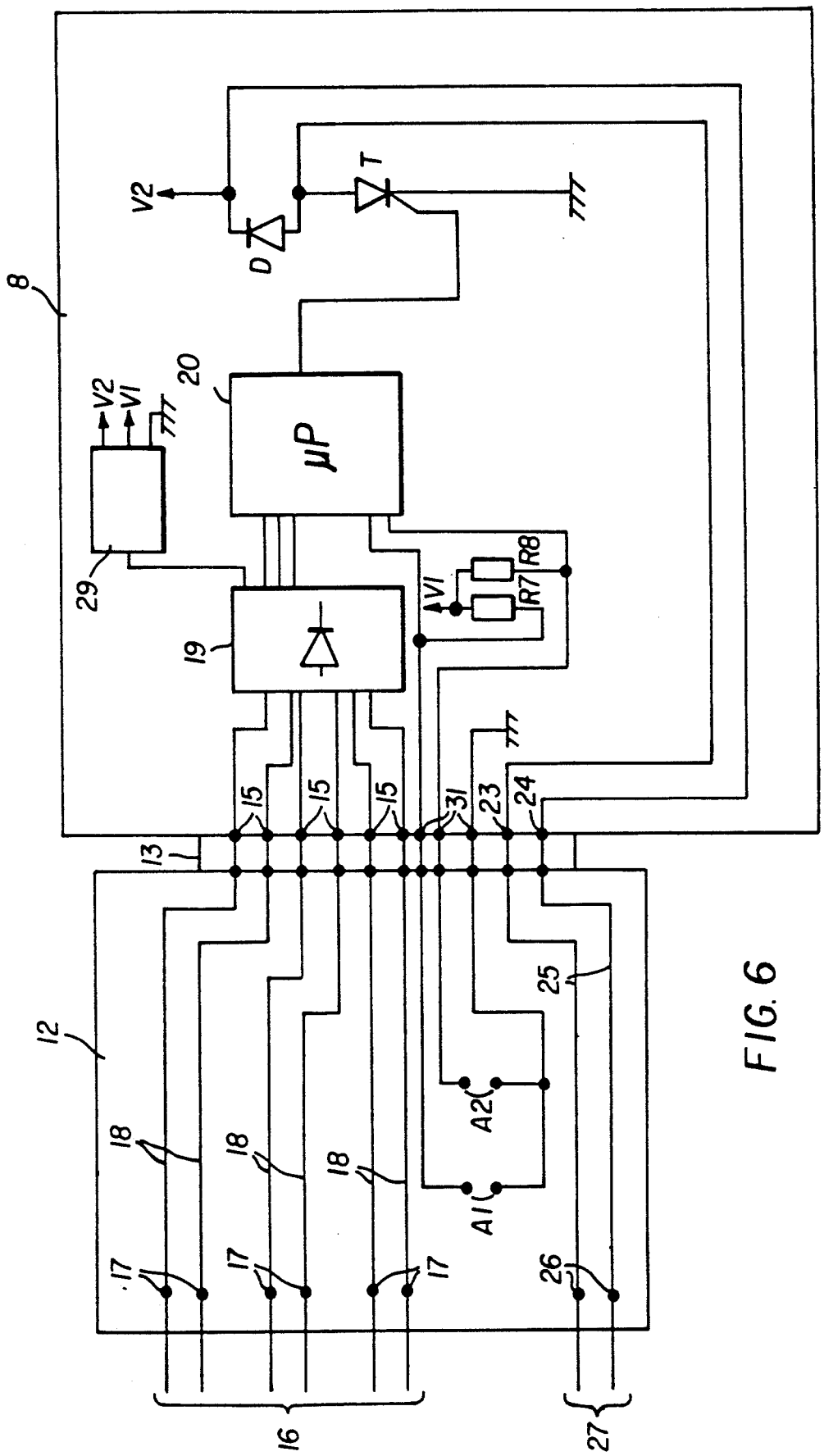

The interface card represented in FIGS. 5 and 6 enables the trip device to be supplied with information representative of the rated current of the current transformers 4.

In the embodiment represented in FIG. 5, the interface card comprises a resistance R5 whose value is representative of this rated current. The resistance is connected between two terminals of the connector 13 associated with two input terminals 30 of the trip device. One of the terminals 30 is grounded whereas the other terminal 30 is connected, via a resistance R6 of preset value, to a preset supply voltage, for example V1. The resistances R5 and R6 thus form a divider bridge whose mid-point voltage depends on the value of the resistance R5, and therefore on the value of the rated current. This divider bridge mid-point voltage is applied to the processing circuit 20, which comprises means for decoding this information and which uses this value notably for computing the currents measured by the current transformers and for displaying the current values if applicable.

The resistance R5 could be replaced by an impedance, whose value, representative of the rated current, is interpreted by the trip device.

FIG. 6 illustrates another embodiment, wherein the interface card supplies the trip device with information representative of the rated current of the current transformers in binary coded form. A first jumper A1 is fitted between two terminals of the interface connector 13, a second jumper A2 being fitted between one of these terminals and another terminal of the connector 13. The three terminals are associated with terminals 31 of the trip device. The common terminal 31 is grounded, the other two terminals 31 being respectively connected by resistances R7 and R8 to the voltage V1 and to inputs of the processing circuit 20. These inputs are respectively at logic level 0 when the corresponding jumper grounds the associated terminal 31, and at logic level 1 when the jumper is removed. Two jumpers A1 and A2 enable four rated current values to be coded. The processing circuit 20 naturally comprises, for example in the form of a table stored in memory, means for decoding this information and for deducing therefrom the corresponding rated current value. The number of jumpers is adapted to the number of current transformers of different rating liable to be associated with a single standard trip device. The jumpers can be replaced by any other type of selective electrical connection, for example by microswitches.

In order not to needlessly overload the figures, the interface card and trip device of FIG. 4 do not comprise the means enabling the trip device to know the rated current value, and, reciprocally, FIGS. 5 and 6 do not comprise the means for adjusting the instantaneous tripping threshold. It is however quite obvious that these two types of means are preferably combined on a single interface card, the standard trip device comprising means for interpreting information relating both to the rated current and to the instantaneous tripping threshold.

We claim:

1. A circuit breaker comprising: a housing body; current measurement means for measuring the current flowing in conductors to be protected; a standard removable electronic trip device comprising a processing circuit for producing a tripping signal when the current measured by the current measurement means exceeds preset tripping thresholds; and an interface card, fixed to the housing body, and connected to the trip device when the trip device is located in the housing body; wherein the interface card comprises means representative of the circuit breaker type and/or rating and an output connector to which said means are connected, said output connector being connected to a complementary connecting device of the trip device, which is connected to the trip device processing circuit, thereby supplying the processing circuit with information representative of the circuit breaker type and/or rating.

2. The circuit breaker according to claim 1, wherein the means representative of the circuit breaker type and/or rating comprise means for adjusting an instantaneous tripping threshold according to the circuit breaker type and rating.

3. The circuit breaker according to claim 2, wherein the trip device comprises a divider bridge formed by at least two resistances to set a minimum instantaneous tripping threshold, and the interface card comprises at least one resistance, adapted to suit the circuit breaker type and rating, designed to be connected in parallel to one of the divider bridge resistances when the trip device is connected in the circuit breaker.

4. The circuit breaker according to claim 3, wherein the interface card comprises resistances connected in parallel and whose connections to the interface card output connector are selectively interrupted according to the circuit breaker type and rating.

5. The circuit breaker according to claim 1, wherein the means representative of the circuit breaker type and/or rating comprise means representative of the rated current supplied by the means for measuring the current, the trip device comprising means for applying to the processing circuit signals representative of the value of said rated current when the trip device is connected in the circuit breaker.

6. The circuit breaker according to claim 5, wherein the means representative of the rated current comprises a resistance.

7. The circuit breaker according to claim 5, wherein the means representative of the rated current supplies information coded in binary form.

8. The circuit breaker according to claim 7, wherein the means representative of the rated current comprises a plurality of selective electrical connections between terminals of the output connector of the interface card.

9. The circuit breaker according to claim 1, wherein the interface card comprises a printed circuit card comprising conductors connecting a preset number of terminals of the interface card output connector to a preset number of interface card inputs, said inputs being connected to components of the circuit breaker.

10. The circuit breaker according to claim 9, wherein certain inputs of the interface card are connected to the outputs of the means for measuring the current, two other inputs of the interface card being connected to the ends of a trip coil located in the circuit breaker.

* * * * *